US012648677B1

(12) United States Patent
Su

(10) Patent No.: US 12,648,677 B1
(45) Date of Patent: Jun. 9, 2026

(54) WET TISSUE HEATER

(71) Applicant: Qiongbin Su, Hongkong (CN)

(72) Inventor: Qiongbin Su, Hongkong (CN)

( * ) Notice: Subject to any disclaimer, the term of this patent is extended or adjusted under 35 U.S.C. 154(b) by 0 days.

(21) Appl. No.: 18/991,694

(22) Filed: Dec. 23, 2024

(30) Foreign Application Priority Data

Dec. 11, 2024 (CN) ......................... 202423049085.0

(51) Int. Cl.
*A47K 10/18* (2006.01)
*H05B 3/06* (2006.01)

(52) U.S. Cl.
CPC ............... *A47K 10/18* (2013.01); *H05B 3/06* (2013.01)

(58) Field of Classification Search
CPC .................. A47K 10/18; A47K 10/422; A47K 2010/3246; A47K 10/421; A47K 2010/3266; H05B 3/06
USPC ........................................................... 221/45
See application file for complete search history.

(56) References Cited

U.S. PATENT DOCUMENTS 4,611,768 A * 9/1986 Voss ....................... A47K 10/36 242/564.2
4,662,664 A * 5/1987 Wendt ................ A47K 10/3687 292/87
5,231,266 A * 7/1993 Warren ................ A47K 10/421 219/521
5,542,567 A * 8/1996 Julius ................. B65D 83/0805 221/63
5,667,092 A * 9/1997 Julius ...................... B65D 43/20 220/784
6,192,895 B1 * 2/2001 Yuhara ................... A45D 40/22 132/300
6,667,464 B2 * 12/2003 Ellis ........................ A47K 10/06 219/393
6,702,109 B1 * 3/2004 Tabuchi ............. B65D 75/5838 53/133.4
6,902,077 B1 * 6/2005 Tack ..................... A47K 10/421 220/254.1
7,094,992 B1 * 8/2006 Wray ................... A47K 10/421 219/386
7,631,761 B2 * 12/2009 Gradzewicz ......... A47K 10/421 220/592.01
7,648,046 B2 * 1/2010 Sosalla ................. F28D 20/023 221/36
7,654,412 B2 * 2/2010 Amundson ............ A47K 10/38 221/36
8,044,325 B1 * 10/2011 Cooper .................. A47K 10/32 219/439

(Continued)

FOREIGN PATENT DOCUMENTS

EP 2826408 A1 * 1/2015 ........... A47K 10/423
JP 3278305 B2 * 4/2002 ........... A47K 10/423

*Primary Examiner* — Rakesh Kumar
(74) *Attorney, Agent, or Firm* — JEEN IP LAW, LLC

(57) ABSTRACT

Disclosed is a wet tissue heater. The wet tissue heater includes a box body provided with an opening at an upper end. A box cover is hinged to an upper opening of the box body. The box cover includes a cover housing and a moisturizing cover, the cover housing is provided with a first heating cavity, the moisturizing cover is hinged to the cover housing, and the moisturizing cover is configured to open and close the first heating cavity. A first heating assembly is arranged in the cover housing, and the first heating assembly is capable of heating wet tissues placed in the first heating cavity. A second heating cavity is provided in the box body.

8 Claims, 10 Drawing Sheets

(56) References Cited

U.S. PATENT DOCUMENTS

| | | | | |
|---|---|---|---|---|
| 8,573,715 | B1 * | 11/2013 | Jackman | A47K 10/32<br>49/382 |
| 9,334,077 | B2 * | 5/2016 | Clouser | B65C 11/00 |
| 9,788,694 | B2 * | 10/2017 | Hill | A47K 10/421 |
| 2004/0084438 | A1 * | 5/2004 | McConnell | A47K 10/421<br>219/438 |
| 2005/0133387 | A1 * | 6/2005 | Cohen | B65D 83/0805<br>206/449 |
| 2007/0084846 | A1 * | 4/2007 | Hsu | A47J 36/2433<br>219/387 |
| 2010/0188227 | A1 * | 7/2010 | Yang | G08B 13/2434<br>340/572.1 |
| 2013/0020346 | A1 * | 1/2013 | Lee | A47K 10/422<br>221/45 |
| 2013/0233853 | A1 * | 9/2013 | Yang | B65F 1/02<br>220/211 |
| 2013/0321153 | A1 * | 12/2013 | Yang | E05B 73/0041<br>340/572.1 |
| 2015/0137977 | A1 * | 5/2015 | Yang | E05B 73/0041<br>340/572.8 |

* cited by examiner

WET TISSUE HEATER

TECHNICAL FIELD

The present disclosure relates to the field of small electrical appliances, and specifically relates to a wet tissue heater.

BACKGROUND

As common articles of daily use for modern women, wet tissues and masks' direct use can make people uncomfortable in winter with low temperature. Thus, a wet tissue heater is required to heat them.

Wet tissue heaters are diversified in types and structures in the current market. For instance, the patent with an application number of CN202322497132.7 disclosed a wet tissue heater. It includes a housing, an inner container is arranged in the housing, an electrical heating body is arranged on a surface of the inner container, and a limiting device is arranged in the inner container so as to keep a distance between an edge of a wet tissue and an inner wall of the inner container. The limiting device is a frame body or a basket body. The frame body abuts against the edge of the wet tissue. The basket body is mounted in the inner container. The basket body is provided with a plurality of air vents. A top edge of the basket body abuts against the inner wall of the inner container. The inner container is hinged to a movable cover. The movable cover is provided with a handle. A bottom surface of the movable cover is provided with a positioning block. The handle and the positioning block are integrated. A magnetic attraction body is fixed to the bottom surface of the movable cover.

The wet tissue heater provided by the above patent is configured to keep the distance between the edge of the wet tissue and the inner wall of the inner container through the limiting device. In this way, advantages of rapid heating within specified time and no yellowing are achieved. However, the wet tissue heater has a problem of a single function due to its only one heating cavity configured to place wet tissues, which needs further improvement.

SUMMARY

An objective of the present disclosure is to provide a wet tissue heater, so as to solve a problem of a single function of an existing wet tissue heater due to its only one heating cavity configured to place wet tissues.

The present disclosure is implemented as follows: a wet tissue heater includes a box body provided with a first opening at an upper end. A box cover is hinged to the first opening of the box body. The box cover includes a cover housing and a moisturizing cover. The cover housing is provided with a first heating cavity. The moisturizing cover is hinged to the cover housing. The moisturizing cover is configured to open and close the first heating cavity. A first heating assembly is arranged in the cover housing. The first heating assembly is capable of heating wet tissues placed in the first heating cavity. A second heating cavity is provided in the box body. A bottom of the second heating cavity is provided with a second heating assembly. The second heating assembly is capable of heating wet tissues placed in the second heating cavity.

Further, an inner housing provided with a second opening at an upper end is arranged in the box body. The second heating cavity is an accommodating cavity having a certain depth of the inner housing. The second heating assembly is arranged below a bottom wall of the inner housing.

Further, a bottom wall of the box body is provided with a drawer. The drawer is located below the second heating assembly. The drawer is provided with a pull rope.

Further, the first opening of the box body is provided with a locking table hole. A side wall of the first opening of the box body is provided with a sliding recess. A locking table is mounted in the locking table hole. A pushing rod is slidably arranged in the sliding recess. A reset spring is arranged at one side of the locking table. The pushing rod is connected to the locking table. A position on the box cover corresponding to the locking table hole is provided with a lock catch used in cooperation with the locking table.

Further, a rubber seal ring is arranged at a periphery of a third opening of the first heating cavity. The rubber seal ring is pressed tightly by the moisturizing cover when the moisturizing cover is closed.

Further, an electrical mounting cavity is provided in the cover housing. A key circuit board is arranged in the electrical mounting cavity. The first heating assembly and the second heating assembly are both electrically connected to the key circuit board. The key circuit board is provided with a plurality of functional keys. The box cover is provided with key openings configured to expose the functional keys.

Further, the box body is provided with a power input jack. The power input jack is electrically connected to the key circuit board, the first heating assembly and the second heating assembly.

Further, the first heating assembly and the second heating assembly each include an electrical heating element and a temperature sensor. The electrical heating element is an electric heating plate or an electric heating wire.

Further, a motor mounting cavity is provided in the cover housing. A driving motor is mounted in the motor mounting cavity. A rotating shaft of the driving motor is fixedly connected to the moisturizing cover. The driving motor drives the moisturizing cover to rotate, such that the moisturizing cover is opened and closed.

Further, a shifting rod is mounted on the rotating shaft of the driving motor. A position in the cover housing close to the shifting rod is provided with a mounting frame. A first micro switch and a second micro switch are mounted on the mounting frame. The first micro switch is located above the second micro switch. The shifting rod is provided with a first stroke triggering point and a second stroke triggering point having a certain distance. The driving motor rotates to drive the shifting rod to rotate synchronously. In response to determining that the shifting rod rotates to the first stroke triggering point so as to trigger the first micro switch, the driving motor drives the moisturizing cover to be closed. In response to determining that the shifting rod rotates to the second stroke triggering point so as to trigger the second micro switch, the driving motor drives the moisturizing cover to be opened completely.

Compared with the prior art, the present disclosure has the beneficial effects:

1. The present disclosure has three heating cavities configured to place wet tissues, including the first heating cavity, the second heating cavity and an inner cavity of the drawer. In addition, the first heating assembly and the second heating assembly are arranged, the first heating assembly is capable of heating the wet tissues in the first heating cavity, and the second heating assembly is capable of heating the wet tissues in the second heating cavity and the drawer. In this way, the present disclosure is flexible to use and rich in functions.

2. According to the present disclosure, the moisturizing cover is arranged, the rubber seal ring is arranged at the periphery of the third opening of the first heating cavity, and the rubber seal ring is pressed tightly by the moisturizing cover when the moisturizing cover is closed, such that the first heating cavity is sealed, and moisture loss of the wet tissues in the first heating cavity can be prevented.
3. The moisturizing cover of the present disclosure is electrically controlled to be opened and closed, and the present disclosure is convenient to use.

Figure 1:
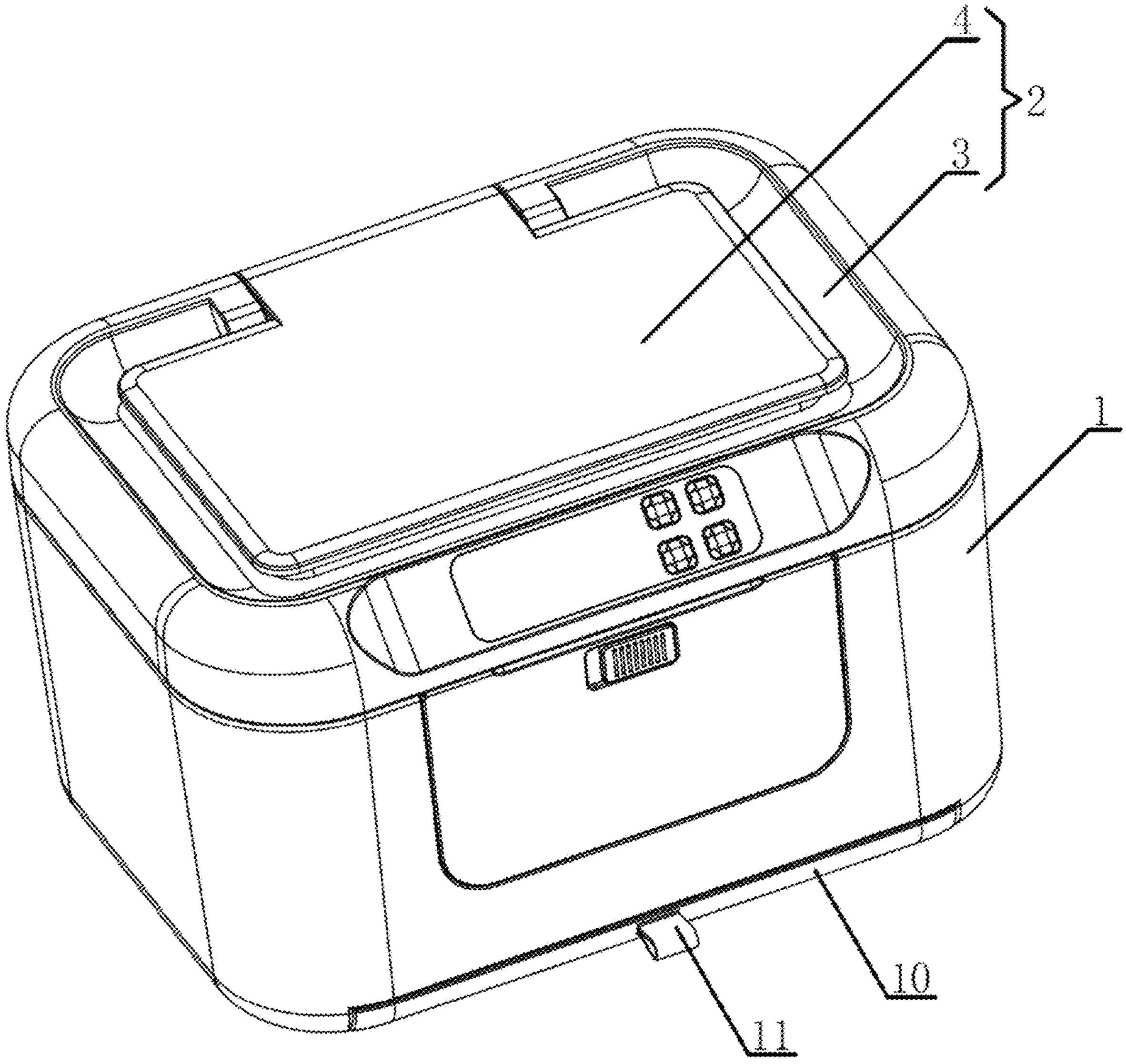
FIG. 1 is a schematic diagram of a top view of a solid structure of the present disclosure.

In the figures: 1, box body; 2, box cover; 3, cover housing; 4, moisturizing cover; 5, first heating cavity; 6, first heating assembly; 7, second heating cavity; 8, second heating assembly; 9, inner housing; 10, drawer; 11, pull rope; 12, locking table; 13, pushing rod; 14, lock catch; 15, rubber seal ring; 16, key circuit board; 17, functional key; 18, power input jack; 19, motor mounting cavity; 20, shifting rod; 21, first micro switch; 22, second micro switch; 23, first stroke triggering point; and 24, second stroke triggering point; 100, first opening; 200, locking table hole; 300, side wall; 301, sliding recess; 40, third opening; 50, electrical mounting cavity; 60, reset spring; 70, driving motor.

DETAILED DESCRIPTIONS OF THE EMBODIMENTS

In the present disclosure, unless expressly specified and defined otherwise, the terms "mount", "connect", "connected" and "fix" are to be construed broadly. For instance, they can denote fixed connection, detachable connection or integral connection, denote mechanical connection or electric connection, denote direct connection or indirect connection by means of an intermediate medium, or denote communication between interiors of two elements or interaction between two elements. For those of ordinary skill in the art, specific meanings of the above terms in the present disclosure can be understood according to specific circumstances.

Illustration will be further provided below with reference to accompanying drawings and specific examples:

As shown in FIGS. 1-3, 5, 6 and 9, a wet tissue heater includes a box body 1. The box body 1 is provided with a first opening 100 at an upper end. An inner housing 9 provided with a second opening at an upper end is arranged in the box body 1. A box cover 2 is hinged to an first opening 100 of the box body 1. The box cover 2 includes a cover housing 3 and a moisturizing cover 4. The cover housing 3 is provided with a first heating cavity 5. The moisturizing cover 4 is hinged to the cover housing 3. The moisturizing cover 4 is configured to open and close the first heating cavity 5. A rubber seal ring 15 is arranged at a periphery of a third opening 40 of the first heating cavity 5. The rubber seal ring 15 is pressed tightly by the moisturizing cover 4 when the moisturizing cover is closed, such that the first heating cavity 5 is sealed, and moisture loss of wet tissues in the first heating cavity 5 can be prevented. A first heating assembly 6 is arranged in the cover housing 3. The first heating assembly 6 is capable of heating a wet tissue or mask placed in the first heating cavity 5. The first heating assembly 6 includes an electrical heating element and a temperature sensor. The electrical heating element is an electric heating plate or an electric heating wire. The electrical heating element is configured for heating, and the temperature sensor is configured for temperature feedback, such that a heating temperature can be controlled. The inner housing 9 is provided with an accommodating cavity having a certain depth. The accommodating cavity is a second heating cavity 7. A second heating assembly 8 is arranged below a bottom wall of the inner housing 9. The second heating assembly 8 is capable of heating a wet tissue or mask placed in the second heating cavity 7.

Figure 4:
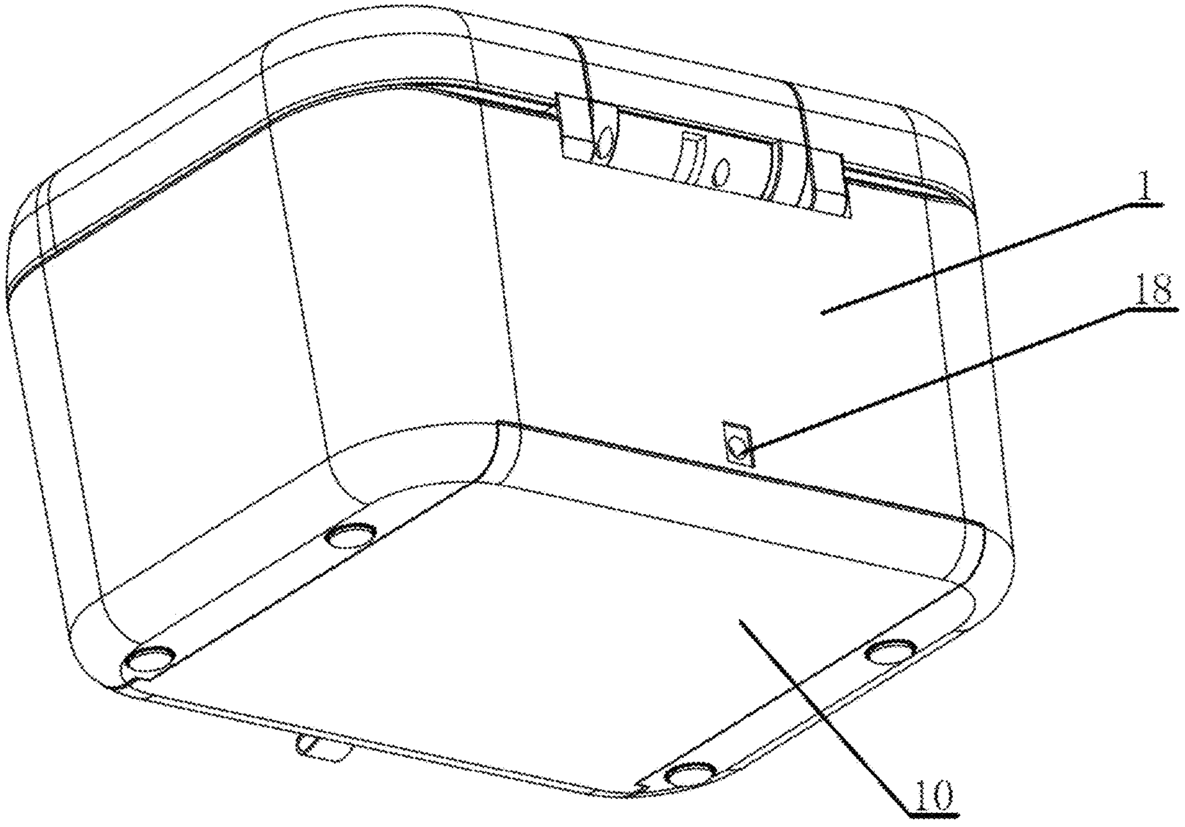
FIG. 4 is a schematic diagram of a bottom view of a solid structure of the present disclosure.

As shown in FIGS. 1 and 4, a bottom wall of the box body 1 is provided with a drawer 10. The drawer 10 is located below the second heating assembly 8. The drawer 10 is configured to place masks and wet tissues. The second heating assembly 8 is further capable of heating a wet tissue or mask placed in the drawer 10. The drawer 10 is provided with a pull rope 11, such that the drawer 10 is conveniently opened and closed.

Figure 2:
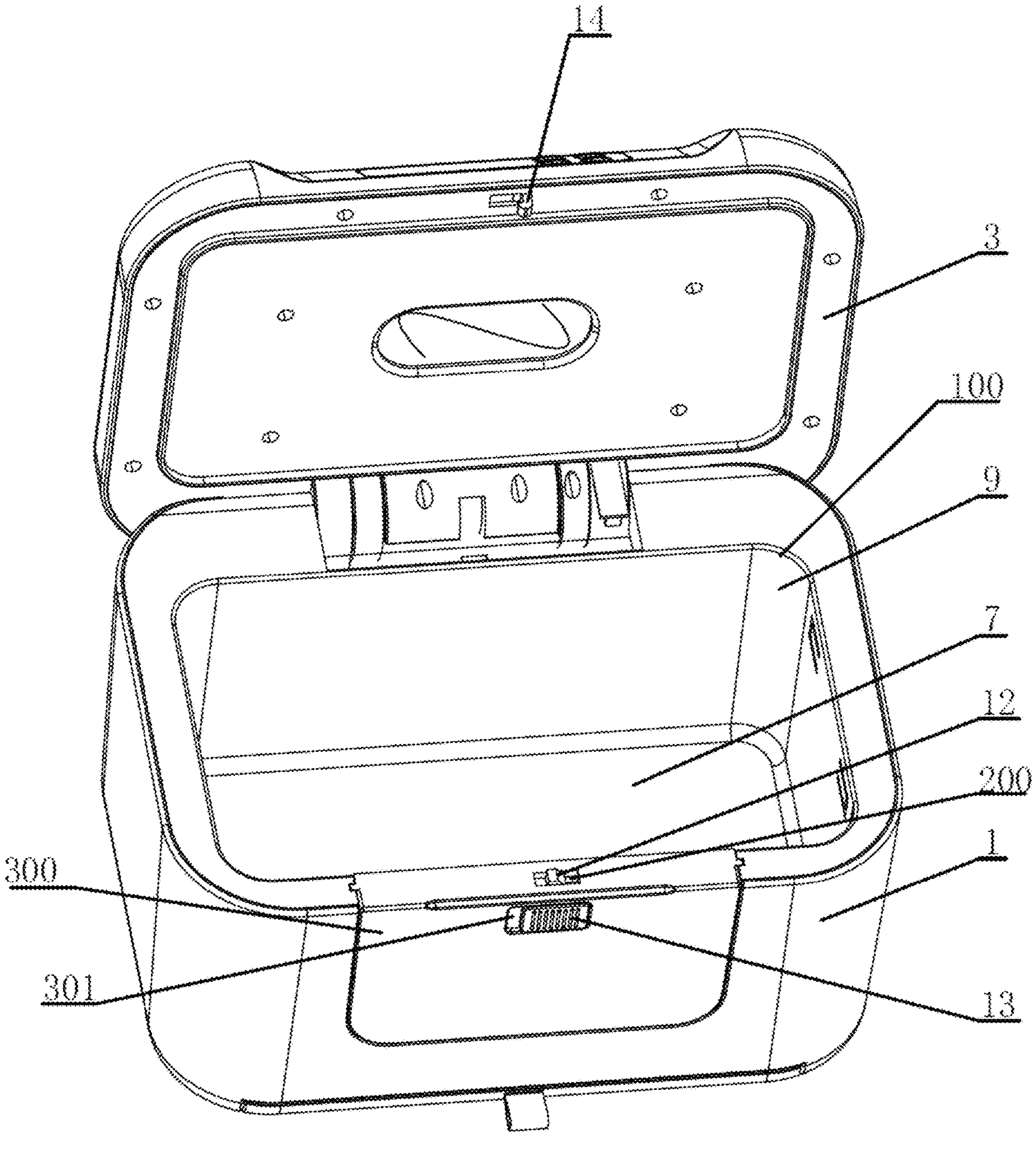
FIG. 2 is a schematic diagram of a solid structure of the present disclosure when a box cover is opened.
Figure 8:
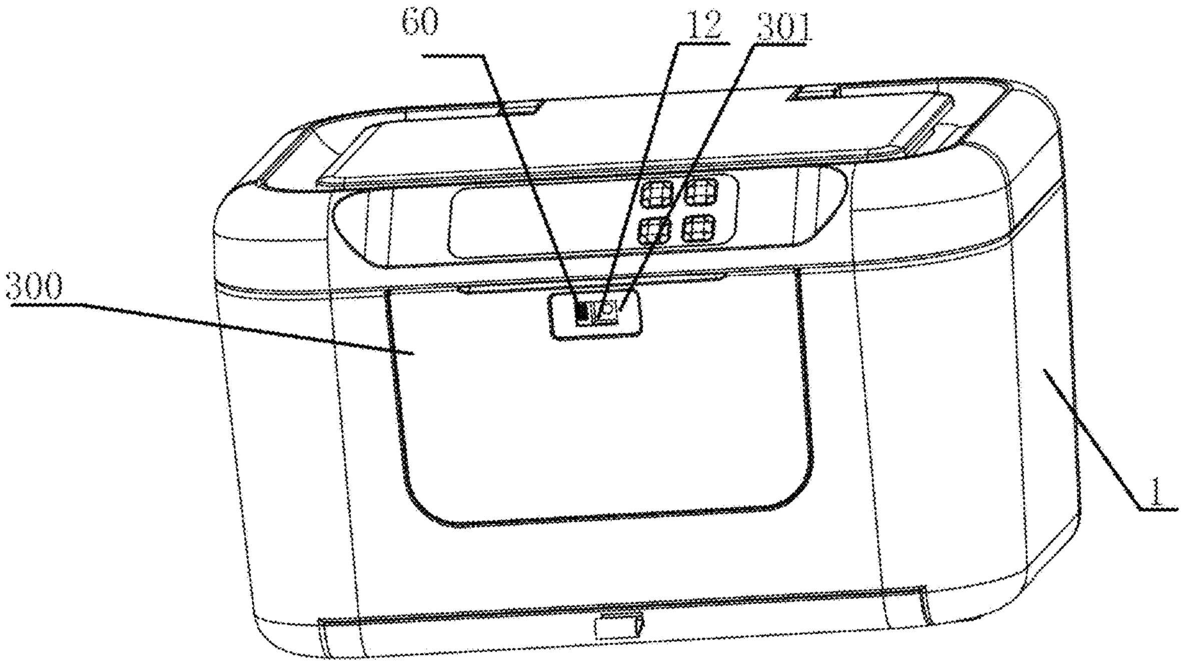
FIG. 8 is another schematic diagram of the top view of the solid structure of the present disclosure.
Figure 9:
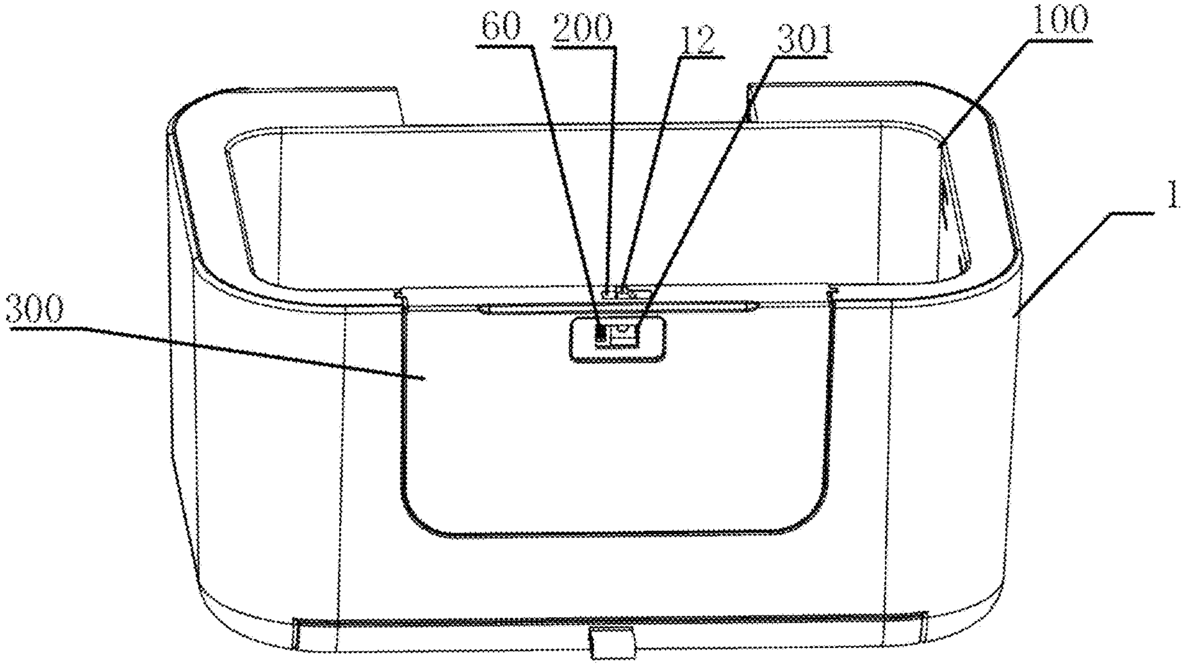
FIG. 9 is a schematic diagram of a top view of a solid structure of the present disclosure with a moisturizing cover.

As shown in FIG. 2 and FIG. 8, the first opening 100 of the box body 1 is provided with a locking table hole 200. A side wall 300 of the first opening 100 of the box body 1 is provided with a sliding recess 301. A locking table 12 is mounted in the locking table hole 200. A pushing rod 13 is slidably arranged in the sliding recess 301. A reset spring 60 is arranged at one side of the locking table 12. The pushing rod 13 is connected to the locking table 12. The reset spring 60 is configured to automatically reset the pushing rod 13 and the locking table 12. A position on the box cover 2 corresponding to the locking table hole 200 is provided with a lock catch 14 used in cooperation with the locking table 12. The locking table 12 and the lock catch 14 are used in cooperation, such that the box cover 2 may firmly cover the first opening 100 of the box body 1, that is, may cover the second heating cavity 7.

Figure 5:
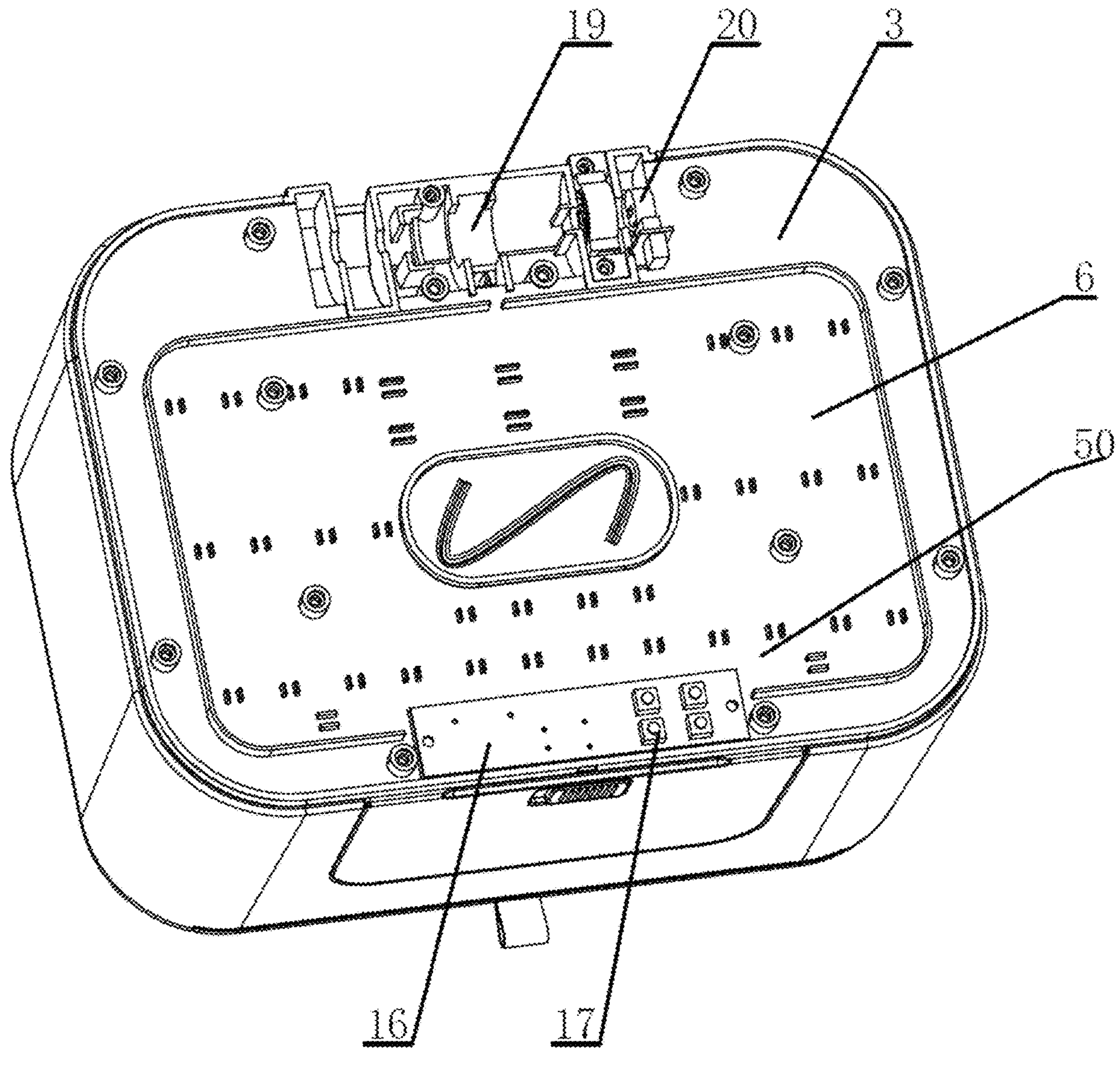
FIG. 5 is a schematic diagram of an internal structure of a cover housing of the present disclosure.
Figure 6:
FIG. 6 is a schematic structural diagram of an inner housing of the present disclosure.
Figure 7:
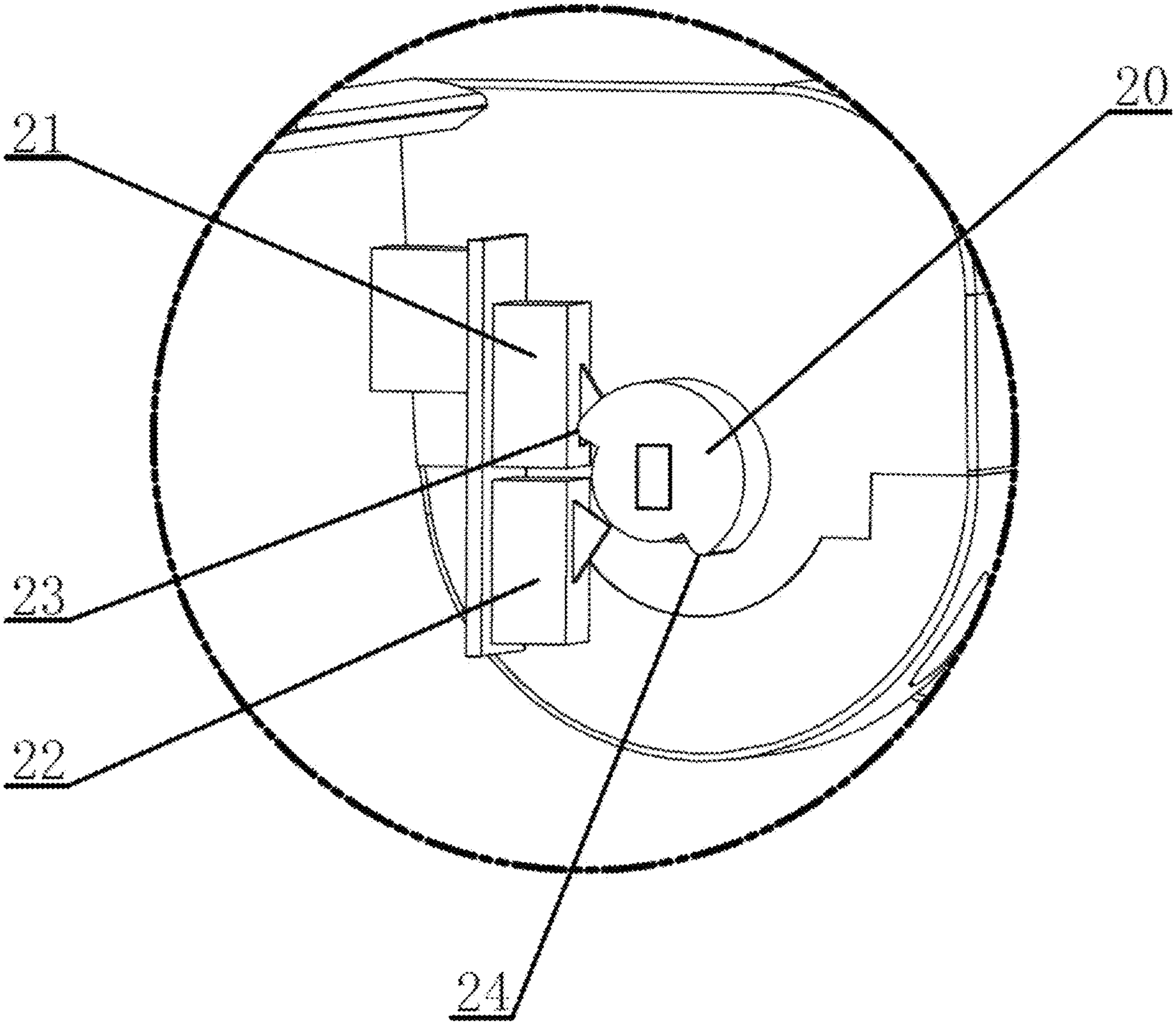
FIG. 7 is an enlarged view of a connection position between a shifting rod and a micro switch of the present disclosure.
Figure 10:
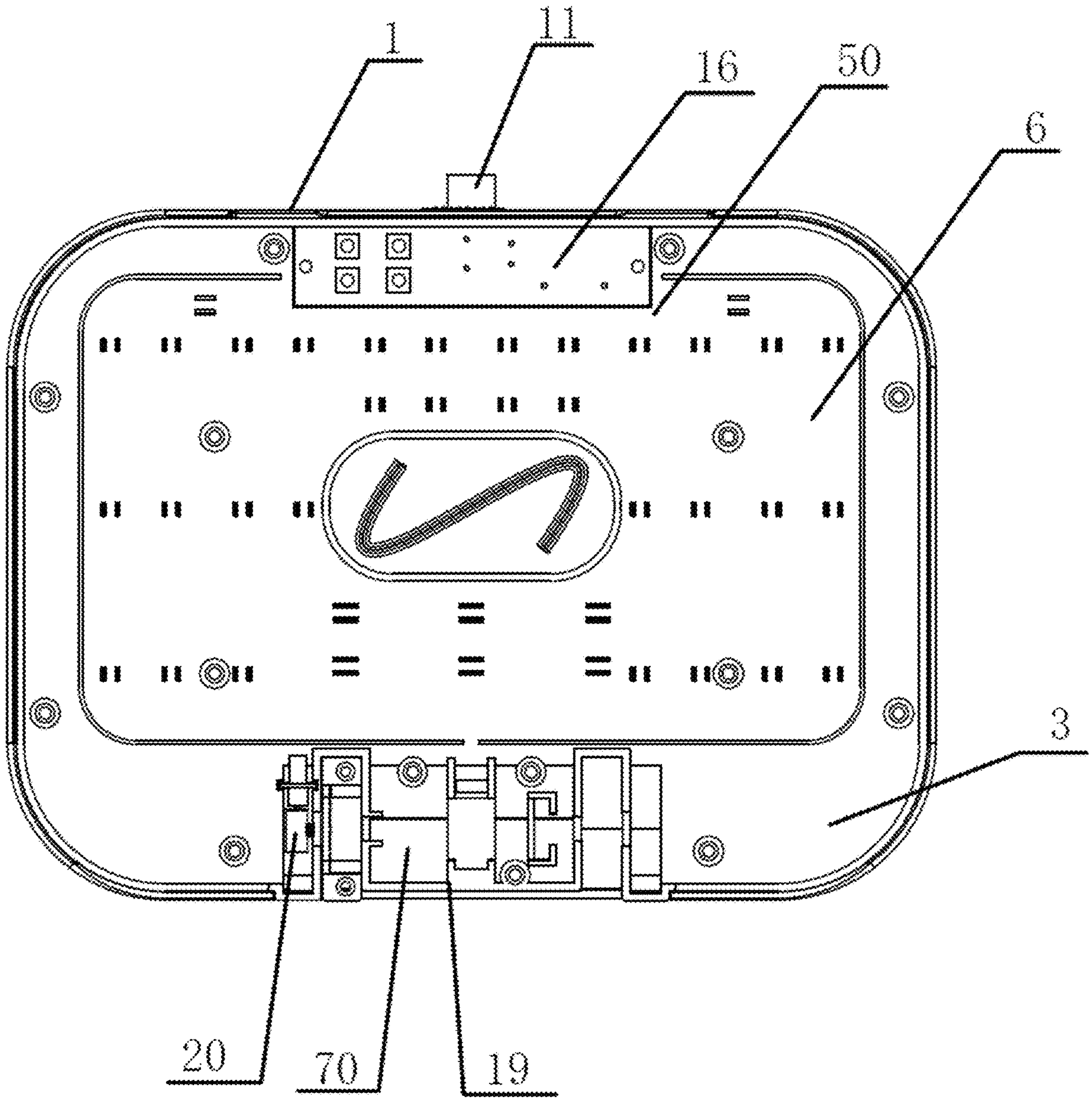
FIG. 10 is another schematic diagram of the bottom view of the solid structure of the present disclosure.

As shown in FIGS. 5, 7 and 10, a motor mounting cavity 19 is provided in the cover housing 3. A driving motor 70 is mounted in the motor mounting cavity 19. In the example, a reduction motor is used as the driving motor 70. A rotating shaft of the driving motor 70 is fixedly connected to the moisturizing cover 4. The driving motor 70 drives the moisturizing cover 4 to rotate, such that the moisturizing cover 4 is opened and closed. A shifting rod 20 is mounted on the rotating shaft of the driving motor 70. A position in the cover housing 3 close to the shifting rod 20 is provided with a mounting frame. A first micro switch 21 and a second micro switch 22 are mounted on the mounting frame. The driving motor 70 is electrically connected to the first micro switch 21 and the second micro switch 22. The first micro switch 21 is located above the second micro switch 22. The shifting rod 20 is provided with a first stroke triggering point 23 and a second stroke triggering point 24 having a certain distance. The driving motor 70 rotates to drive the shifting rod 20 to rotate synchronously. In response to determining that the shifting rod 20 rotates to the first stroke triggering point 23 so as to trigger the first micro switch 21, the driving motor 70 drives the moisturizing cover 4 to be closed. In response to determining that the shifting rod 20 rotates to the second stroke triggering point 24 so as to trigger the second micro switch 22, the driving motor 70 drives the moisturizing cover 4 to be opened completely.

Figure 3:
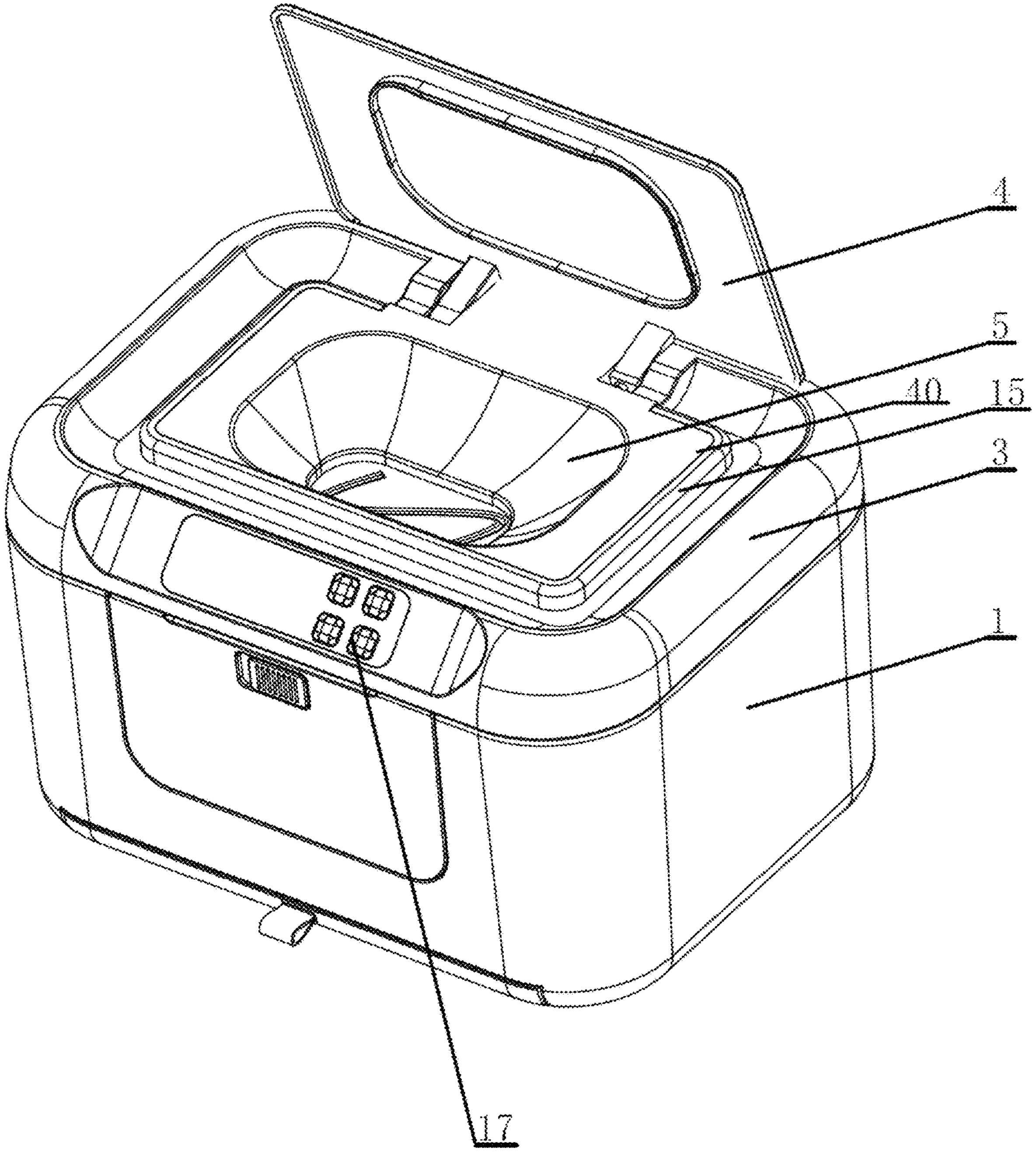
FIG. 3 is a schematic diagram of a solid structure of the present disclosure when a moisturizing cover is opened.

As shown in FIGS. 3, 5 and 10, an electrical mounting cavity 50 is provided in the cover housing 3. A key circuit board 16 is arranged in the electrical mounting cavity 50. The first heating assembly 6 and the second heating assembly 8 are both electrically connected to the key circuit board 16. The key circuit board 16 is provided with a plurality of functional keys 17. The box cover 2 is provided with key openings configured to expose the functional keys 17. The functional keys 17 is configured to control the moisturizing cover 4 to be opened and closed, a heating function to be turned on and off, a heating temperature to be set, and a night light to be opened and closed. When the heating temperature is set, a display screen and a control chip need to be set appropriately. When the night light is opened and closed, the night light needs to be set appropriately.

As shown in FIG. 4 and FIG. 10, the box body 1 is provided with a power input jack 18. The power input jack 18 is electrically connected to the key circuit board 16, the first heating assembly 6, the second heating assembly 8, the driving motor 70, the micro switches, etc. The power input jack 18 is connected to an external power supply through a power line, such that power is supplied to all electrical components of the present disclosure.

In conclusion, the present disclosure has three heating cavities configured to place wet tissues, including the first heating cavity 5, the second heating cavity 7 and an inner cavity of the drawer 10. In addition, the first heating assembly 6 and the second heating assembly 8 are arranged, the first heating assembly 6 is capable of heating the wet tissues in the first heating cavity 5, and the second heating assembly 8 is capable of heating the wet tissues in the second heating cavity 7 and the drawer 10. In this way, the present disclosure is flexible to use and rich in functions. According to the present disclosure, the moisturizing cover 4 is arranged, the rubber seal ring 15 is arranged at the periphery of the third opening 40 of the first heating cavity 5 (shown in FIG. 3), and the rubber seal ring 15 is pressed tightly by the moisturizing cover 4 when the moisturizing cover is closed, such that the first heating cavity 5 is sealed, and moisture loss of the wet tissues in the first heating cavity 5 can be prevented. The moisturizing cover 4 of the present disclosure is driven to be opened and closed by the driving motor 70 (shown in FIG. 10), and the present disclosure is convenient to use.

What are described above are merely preferred embodiments of the present disclosure and are not intended to limit the present disclosure, and those skilled in the art can make various modifications and changes to the present disclosure. Any modification, equivalent substitution, improvement, etc. within the spirit and principle of the present disclosure shall fall within the protection scope of the present disclosure.

What is claimed is:

1. A wet tissue heating device, comprising a box body and a box cover;

wherein an upper end of the box body is provided with a first opening, and the box cover is hinged to the first opening of the box body, the box cover comprises a cover housing and a moisturizing cover, the cover housing is provided with a first heating cavity, the moisturizing cover is hinged to the cover housing, the moisturizing cover is configured to open and close the first heating cavity, a first heating assembly is arranged in the cover housing, and the first heating assembly for heating wet tissues is placed in the first heating cavity; and a second heating cavity is provided in the box body, a bottom of the second heating cavity is provided with a second heating assembly, and the second heating assembly for heating wet tissues is placed in the second heating cavity;

wherein a motor mounting cavity is provided in the cover housing, a driving motor is mounted in the motor mounting cavity, and the driving motor drives the moisturizing cover to rotate, such that the moisturizing cover is opened and closed;

wherein a position in the cover housing close to a shifting rod is provided with a mounting frame, a first micro switch and a second micro switch are mounted on the mounting frame, and the first micro switch is located above the second micro switch; the shifting rod is provided with a first stroke triggering point and a second stroke triggering point; the driving motor rotates to drive the shifting rod to rotate synchronously, and in response to determining that the shifting rod rotates to the first stroke triggering point so as to trigger the first micro switch, the driving motor drives the moisturizing cover to be closed; and in response to determining that the shifting rod rotates to the second stroke triggering point so as to trigger the second micro switch, the driving motor drives the moisturizing cover to be opened completely.

2. The wet tissue heating device according to claim 1, wherein an inner housing provided with a second opening at an upper end is arranged in the box body, the second heating cavity is an accommodating cavity, and the second heating assembly is arranged below a bottom wall of the inner housing.

3. The wet tissue heating device according to claim 2, wherein a bottom wall of the box body is provided with a drawer, the drawer is located below the second heating assembly, and the drawer is provided with a pull rope.

4. The wet tissue heating device according to claim 1, wherein the first opening of the box body is provided with a locking table hole, and a side wall of the first opening of the box body is provided with a sliding recess; a locking table is mounted in the locking table hole, a pushing rod is slidably arranged in the sliding recess, a reset spring is arranged at one side of the locking table, and the pushing rod is connected to the locking table; and a position on the box cover corresponding to the locking table hole is provided with a lock catch used in cooperation with the locking table.

5. The wet tissue heating device according to claim 1, wherein a rubber seal ring is arranged at a periphery of a third opening of the first heating cavity, and the rubber seal ring is pressed tightly by the moisturizing cover when the moisturizing cover is closed.

6. The wet tissue heating device according to claim 1, wherein the first heating assembly and the second heating assembly are both electrically connected to a key circuit board; and the key circuit board is provided with a plurality of functional keys, and the box cover is provided with key openings configured to expose the functional keys.

7. The wet tissue heating device according to claim 1, wherein the box body is provided with a power input jack, and the power input jack is electrically connected to the key circuit board, the first heating assembly and the second heating assembly.

8. The wet tissue heating device according to claim 1, wherein the first heating assembly and the second heating assembly each comprise an electrical heating element and a temperature sensor, and the electrical heating element is an electric heating plate.

* * * * *